(12) United States Patent
Shinomiya et al.

(10) Patent No.: US 11,431,885 B2
(45) Date of Patent: Aug. 30, 2022

(54) COMMUNICATION APPARATUS INCLUDING A COMMUNICATION DEVICE FOR COMMUNICATING WITH AN EXTERNAL APPARATUS, AND TO CONTROL IN ACTIVATING THE COMMUNICATION DEVICE BY THE COMMUNICATION APPARATUS AND METHOD FOR CONTROLLING THE SAME

(71) Applicant: CANON KABUSHIKI KAISHA, Tokyo (JP)

(72) Inventors: Takeshi Shinomiya, Yokohama (JP); Kouji Ikeda, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 16/841,959

(22) Filed: Apr. 7, 2020

(65) Prior Publication Data
US 2020/0344403 A1  Oct. 29, 2020

(30) Foreign Application Priority Data
Apr. 24, 2019  (JP) .............................. JP2019-083331

(51) Int. Cl.
*H04N 5/225*  (2006.01)
*H04N 5/232*  (2006.01)
(Continued)

(52) U.S. Cl.
CPC ....... *H04N 5/23206* (2013.01); *H04L 67/125* (2013.01); *H04W 84/12* (2013.01)

(58) Field of Classification Search
CPC .. H04N 5/23206; H04L 67/125; H04W 84/12
(Continued)

(56) References Cited

U.S. PATENT DOCUMENTS

2005/0007628 A1*  1/2005  Yamano ................ G06F 1/3203
                                                          358/1.15
2010/0036211 A1*  2/2010  La Rue ................ A61B 5/0002
                                                          600/301
(Continued)

FOREIGN PATENT DOCUMENTS

JP   2014-082602 A    5/2014
WO   2016-120976 A1   8/2016

*Primary Examiner* — Usman A Khan
(74) *Attorney, Agent, or Firm* — Canon U.S.A., Inc. IP Division

(57) ABSTRACT

When activating a communication device to start communication, it takes time to perform automatic negotiation processing from when communication device starts processing until communication by the communication device is enabled. A communication apparatus includes a communication device configured to communicate with an external apparatus, and a control unit configured to control the communication apparatus. When starting communication with the external apparatus by activating the communication device in a non-operating state, the control unit controls the communication device such that a setting sequence for making a communication setting for a communication interface based on a predetermined communication method which is included in the communication device is executed in parallel with a starting sequence for activating the communication device.

12 Claims, 10 Drawing Sheets

(51) Int. Cl.
*H04L 67/125* (2022.01)
*H04W 84/12* (2009.01)

(58) Field of Classification Search
USPC ....................................................... 348/207.1
See application file for complete search history.

(56) References Cited

U.S. PATENT DOCUMENTS

| | | | |
|---|---|---|---|
| 2010/0083020 A1* | 4/2010 | Suzuki | G06F 1/3209 |
| | | | 713/320 |
| 2010/0241889 A1* | 9/2010 | Fu | G06F 1/3278 |
| | | | 713/324 |
| 2013/0013757 A1* | 1/2013 | Millington | H04W 12/04 |
| | | | 709/222 |
| 2014/0108840 A1 | 4/2014 | Imao | |
| 2016/0359670 A1 | 12/2016 | Asai | |

* cited by examiner

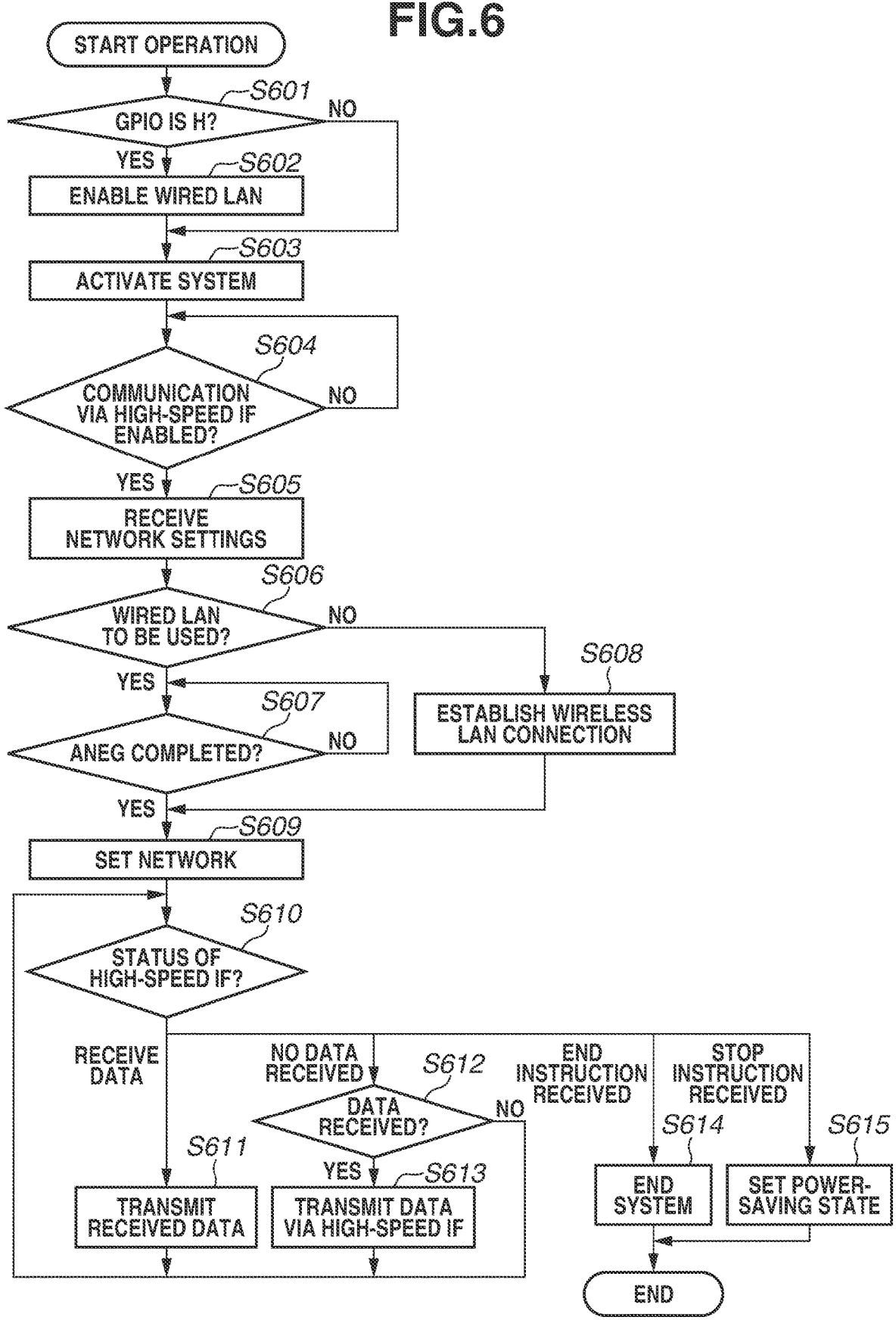

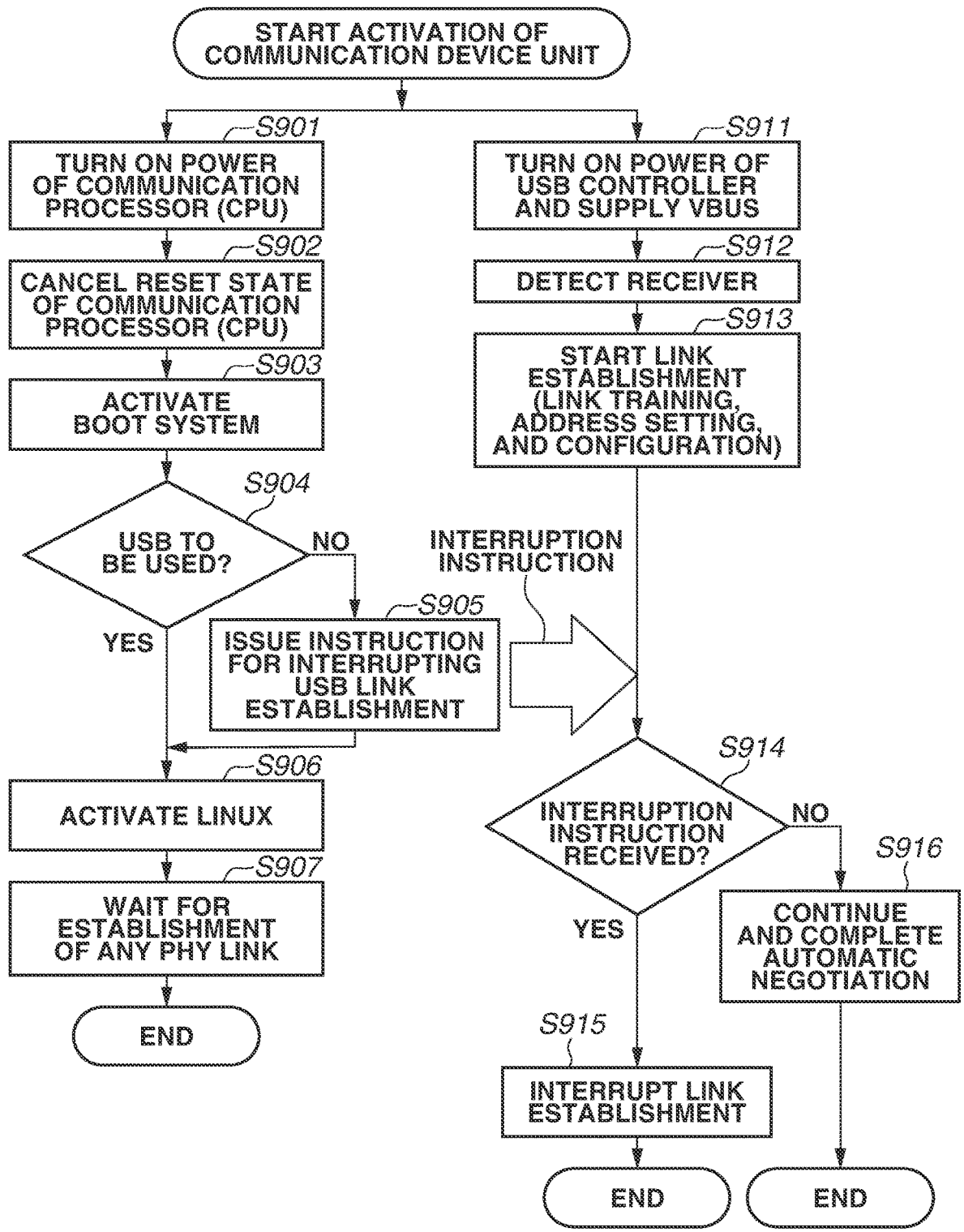

COMMUNICATION APPARATUS INCLUDING A COMMUNICATION DEVICE FOR COMMUNICATING WITH AN EXTERNAL APPARATUS, AND TO CONTROL IN ACTIVATING THE COMMUNICATION DEVICE BY THE COMMUNICATION APPARATUS AND METHOD FOR CONTROLLING THE SAME

BACKGROUND

Field of the Disclosure

The present disclosure relates to a communication apparatus including a communication device for communicating with an external apparatus, and to control in activating the communication device by the communication apparatus.

Description of the Related Art

In a physical layer circuit in a communication system conforming to 1000Base-T (IEEE802.3ab), an automatic negotiation function is used to establish a physical setting (link) for communication with a communication destination. When a communication setting is made by using the automatic negotiation function, it generally takes about 2 to 5 seconds, which depends on the physical layer circuit, connection cables, and other conditions. There is a constraint that the communication is disabled during execution of the automatic negotiation function.

Therefore, there is a problem in that, if the automatic negotiation is not yet completed when starting communication with an external apparatus, the communication cannot be started until the automatic negotiation is completed (for about 2 to 5 seconds).

WO 2016-120976 discusses a communication apparatus capable of setting a physical layer circuit based on results of the automatic negotiation in the past which are stored in a nonvolatile memory.

Japanese Patent Application Laid-Open No. 2014-082602 discusses a communication apparatus which store settings of a physical layer circuit (results of the automatic negotiation) when the communication partner enters the power-saving mode and uses the stored settings when the communication partner returns from the power-saving mode.

However, prior arts discussed in these patent documents include the following problems.

If a network configuration changes from the time when communication settings of the physical layer circuit were stored in the automatic negotiation performed in the past till when the stored communication settings are used, the automatic negotiation needs to be performed again. This applies to a case where the prior art discussed in WO 2016-120976 or Japanese Patent Application Laid-Open No. 2014-082602 is used.

This means that, in such a case, it is necessary to wait until the automatic negotiation is completed before starting the communication.

SUMMARY

According to an exemplary embodiment, a communication apparatus includes a communication device configured to communicate with an external apparatus, and a control unit configured to control the communication apparatus. When starting communication with the external apparatus by activating the communication device in a non-operating state, the control unit controls the communication device such that a setting sequence for making a communication setting for a communication interface based on a predetermined communication method included in the communication device is executed in parallel with a starting sequence for activating the communication device.

Further features of various embodiments will become apparent from the following description of exemplary embodiments with reference to the attached drawings.

BRIEF DESCRIPTION OF THE DRAWINGS

FIG. 6 is a flowchart illustrating an operation of a communicating device included in the communication apparatus according to the first exemplary embodiment.

FIG. 10 is a flowchart illustrating an operation of the communication apparatus according to the third exemplary embodiment.

DESCRIPTION OF THE EMBODIMENTS

A communication apparatus according to exemplary embodiments will be described in detail below with reference to the accompanying drawings.

An example of a digital camera having a network function according to a first exemplary embodiment will be described below.

<Descriptions of Apparatus>

Figure 1:
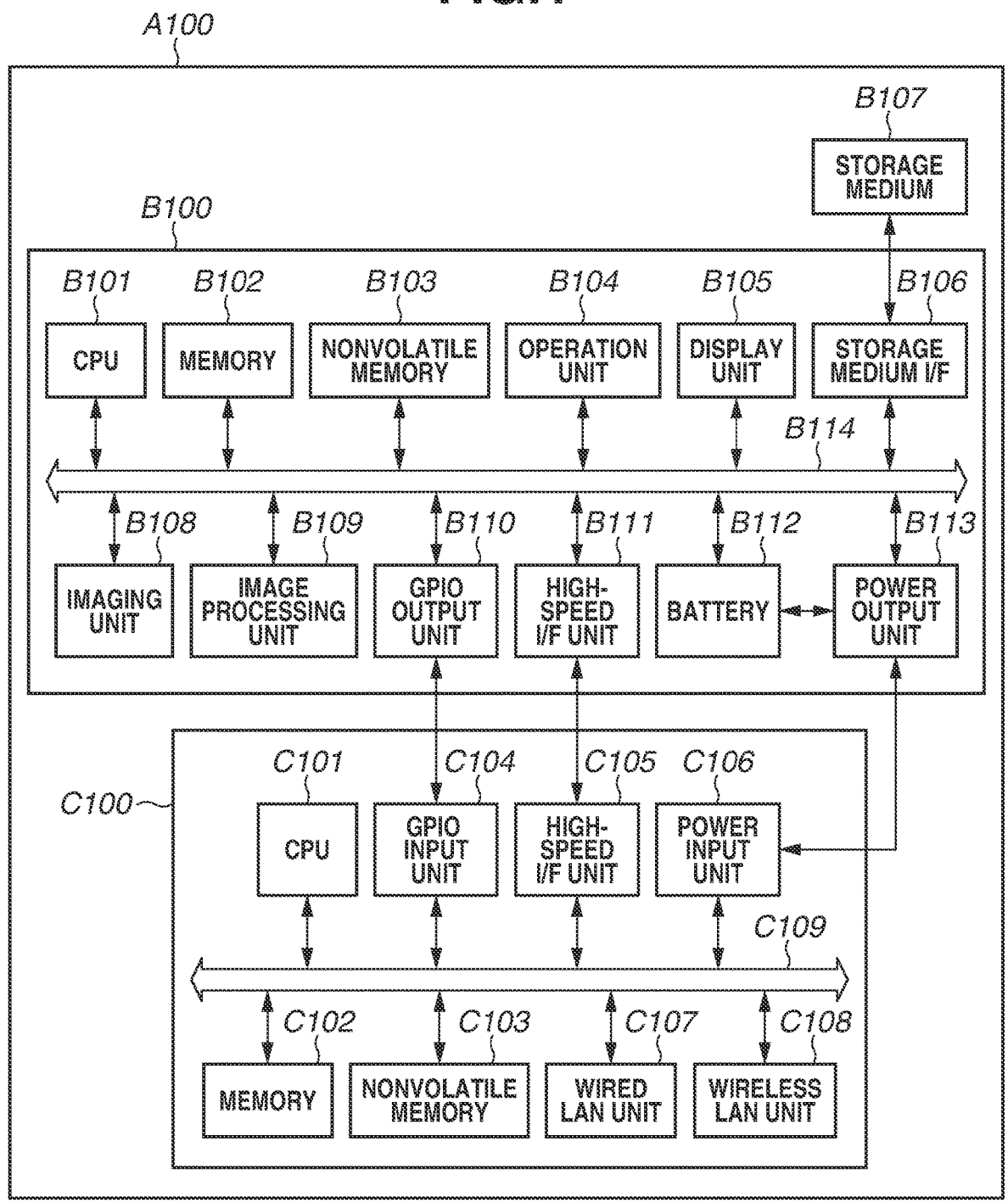
FIG. 1 illustrates a configuration of a communication apparatus according to a first exemplary embodiment.

FIG. 1 is a block diagram illustrating a configuration of the digital camera.

A digital camera body A100 includes a camera device unit B100, and a communication device unit C100 having a function of communicating with an external apparatus.

The camera device unit B100 and the communication device unit C100 are electrically connected with each other via the high-speed interface (I/F) units B111 and C105. The camera device unit B100 and the communication device unit C100 collaboratively operate to implement functions of the digital camera A100.

The camera device unit B100 will be described in more detail below.

A system bus B114 connects with a central processing unit (CPU) B101, a memory B102, a nonvolatile memory B103, an operation unit B104, a display unit B105, a storage medium I/F B106, an imaging unit B108, an image processing unit B109, a general-purpose input/output (GPIO) output unit B110, a high-speed F unit B111, a battery B112, and a power output unit B113.

The CPU B101 controls the entire camera device unit B100. The CPU B101 controls each component of the camera device unit B100 to record a captured image in response to the setting and operation by the user.

The memory B102 is a rewritable memory which functions as a work area for a program for controlling the camera device unit B100. The memory B102 includes, for example, a random access memory (a volatile memory using semiconductor elements).

The nonvolatile memory B103 stores programs for controlling the camera device unit B100, image data, audio data, data to be used by the programs, and other data. The nonvolatile memory B103 also stores data which needs to be retained beyond a power supply cycle, such as user setting information of the digital camera A100.

When the power of the digital camera A100 is turned ON, the power of the camera device unit B100 is also turned ON at the same time. Then, the CPU B101 reads a program from the nonvolatile memory B103 and starts the control of the camera device unit B100. The nonvolatile memory B103 includes, for example, a flash memory or an electrically erasable programmable read only memory (EEPROM).

The operation unit B104, an input device including a plurality of buttons and dials, is used to inform the digital camera A100 of instructions input by the user.

The display unit B105 displays images and screens forming GUIs under the control of the CPU B101. For example, the display unit B105 may include a liquid crystal display (LCD) and an LCD driver unit for controlling the LCD. The CPU B101 generates display control signals according to the program and controls each unit of the camera device unit B100 to output screens corresponding to video signals to the display unit B105.

The storage medium I/F B106 is an interface for attaching a storage medium B107, such as a memory card. Under the control of the CPU B101, the storage medium I/F B106 reads data from the storage medium B107 attached to the storage medium I/F B106 and writes data to the storage medium B107.

The storage medium B107 is a rewritable nonvolatile memory for storing image data captured in image capturing and other data. Examples of the storage medium B107 include a secure digital (SD) card and a Compact Flash® card.

The imaging unit B108 converts an image (light) into an electrical video signal and outputs the video signal to the system bus B114 under the control of the CPU B101. The imaging unit B108 includes, for example, an optical system for controlling an optical lens unit, diaphragm, zoom, and focus, and an imaging sensor for converting light (image) introduced via the optical lens unit into an electrical video signal. Examples of image sensors include a complementary metal oxide semiconductor (CMOS) image sensor and a charge coupled device (CCD) image sensor.

Under the control of the CPU B101, the image processing unit B109 performs various image processing on the image data stored in the nonvolatile memory B103 and the recording medium B107, and the video signals output from the imaging unit B108. The image processing performed by the image processing unit B109 includes analog-to digital (A/D) conversion processing and digital-to-analog (D/A) conversion processing. The image processing performed on the image data further includes encoding processing, compression processing, decoding processing, enlargement/reduction (resizing) processing, noise reduction processing, color conversion processing, and face detection processing. The image processing unit B109 may include a dedicated circuit for performing specific image processing. Depending on the type of the image processing, the CPU B101 can perform the image processing according to a program without using the image processing unit B109.

Under the control of the CPU B101, the GPIO output unit B110 controls the voltage level (High or Low) to be output to the GPIO connector. The GPIO output unit B110 of the camera device unit B100 and the GPIO input unit C104 of the communication device unit C100 are electrically connected with each other. The GPIO input unit C104 can read the voltage level output by the GPIO output unit B110. According to the present exemplary embodiment, two different GPIO signals are connected between the GPIO output unit B110 and the GPIO input unit C104. One GPIO signal indicates whether a local area network (LAN) unit C107 is to be used for communication with an external apparatus. The other GPIO signal is used to activate the communication device unit C100 to return the unit from a non-operating state, such as a power-saving state and a power-off state, to an operating state. More specifically, the GPIO output unit B110 functions as a transmission unit for transmitting a control signal according to the result of the determination whether to use the wired LAN for communication with the external apparatus.

The high-speed I/F unit B111 is able to transmit and receive various data to/from the device connected to the high-speed I/F unit B111 under the control of the CPU B101. For example, Peripheral Component Interconnect (PCI) Express, InfiniBand, and other extension buses can be used as the high-speed I/Fs. In these cases, the high-speed I/F unit B111 corresponds to the PCI Express controller or the InfiniBand controller.

The high-speed I/F unit B111 of the camera device unit B100 and the high-speed I/F unit C104 of the communication device unit C100 are electrically connected with each other. The high-speed I/F unit C105 can receive the data output by the high-speed IF unit B111. Likewise, the high-speed I/F unit B111 can receive the data output by the high-speed I/F unit C105. The high-speed I/F connection enables transmission and reception of data and control commands between the camera device unit B100 and the communication device unit C100.

The battery B112 is a power source unit for supplying power to the digital camera A100 to operate the camera A100. The battery B112 including a rechargeable secondary battery can be charged by an external battery charger (not illustrated). The battery B112 supplies power to the camera device unit B100 and can also supply power to the communication device unit C100 via the power output unit B113.

The power output unit B113 outputs the electric power, which is output by the battery B112, to the outside of the camera device unit B100 under the control of the CPU B101. The power output unit B113 and the power input unit C106 are electrically connected with each other. The power input unit C106 can receive the power output by the power output unit B113. The CPU B101 controls whether to output the power from the power output unit B113 to turn the power to the communication device unit C100 ON or OFF.

The system bus B114 enables the components connected to the system bus B114 to transmit and receive data to/from each other via the system bus B114.

The communication device unit C100 will be described below.

A system bus C109 connects with a CPU C101, a memory C102, a nonvolatile memory C103, the GPIO input unit C104, the high-speed IF unit C105, the power input unit C106, the wired LAN unit C107, and a wireless LAN unit C108.

The CPU C101 controls the entire communication device unit C100. The CPU C101 controls each component of the communication device unit C100 to perform data communication with an external apparatus (not illustrated) under the control of the camera device unit B100.

The memory C102 is a rewritable memory which can be used as a work area for a program for controlling the communication device unit C100. The memory C102 includes, for example, a RAM (a volatile memory using semiconductor elements).

The nonvolatile memory C103 stores a program for controlling the communication device unit C100 and various data used by the program. The nonvolatile memory C103 also stores data which needs to be retained beyond a power supply cycle. When the power of the communication device unit C100 is turned ON and the communication device unit C100 enters the operating state from the non-operating state, the CPU C101 reads a program from the nonvolatile memory C103 and starts controlling the entire communication device unit C100. For example, the nonvolatile memory C103 may include a flash memory or an EEPROM.

The GPIO input unit C104 acquires the signal level (High or Low) input to the GPIO connector under the control of the CPU C101. The GPIO input unit C104 and the GPIO output unit B110 are electrically connected with each other. The GPIO input unit C104 can read the signal level output by the GPIO output unit B110. The GPIO input unit C104 can send an interrupt signal to the CPU C101 in response to the change of the signal level of the GPIO input unit C104. As the signal notified via GPIO, a 1-bit signal representing the signal level in binary form can be used.

The high-speed I/F unit C105 can transmit and receive various data to/from the device connected via the high-speed I/F unit C105 under the control of the CPU C101. The high-speed I/F unit C105 is electrically connected with the high-speed I/F unit B11 with each other. The camera device unit B100 and the communication device unit C100 can communicate the data to each other via the high-speed I/F units B111 and C105.

The power input unit C106 receives the power output by the power output unit B113 to supply the power for operating the communication device unit C100.

The wired LAN unit C107 is a communication unit (communication interface) for implementing wired communication with an external apparatus (not illustrated). The wired LAN unit C107, which includes a connector for wired communication and a controller for processing a wired signal, implements wired communication based on Ethernet® or a communication method conforming to the IEEE802.3 Series (e.g., IEEE802.3ab) standard.

The wired LAN unit C107 supports a plurality of communication speeds (e.g., 1,000 Mbps, 100 Mbps, and 10 Mbps) and a plurality of communication modes (e.g., full-duplex communication and half-duplex communication). The wired LAN unit C107 has an automatic negotiation function for detecting the communication speed and mode usable by the communication partner and automatically changes the communication speed and mode.

The wireless LAN unit C108 is a communication unit for implementing wireless communication with an external apparatus (not illustrated). The wireless LAN unit C108 includes an antenna for wireless communication and a communication controller for processing a wireless signal, and implements wireless communication based on a communication method conforming to the IEEE802.11a.b.g.n.ac standard.

The system bus C109 enables the components connected to the system bus C109 to transmit and receive data to/from each other via the system bus C109.

Figure 2A:
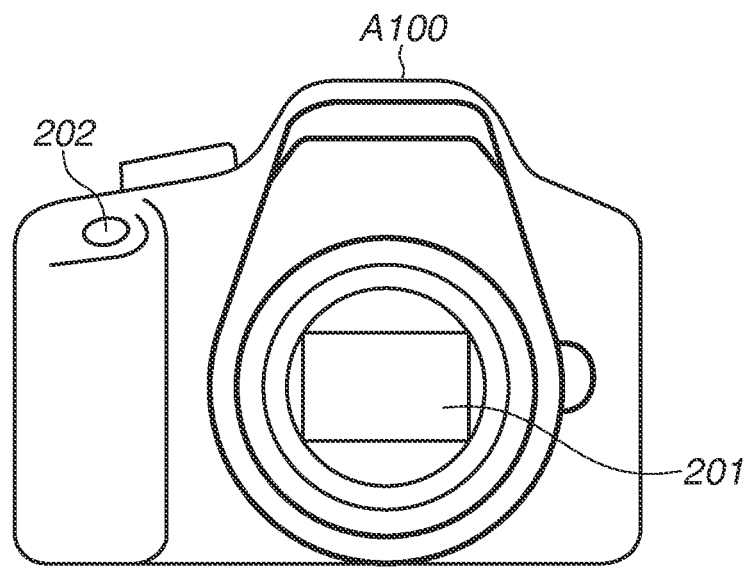
FIGS. 2A and 2B illustrate outer appearances of the communication apparatus according to the first exemplary embodiment.
Figure 2B:
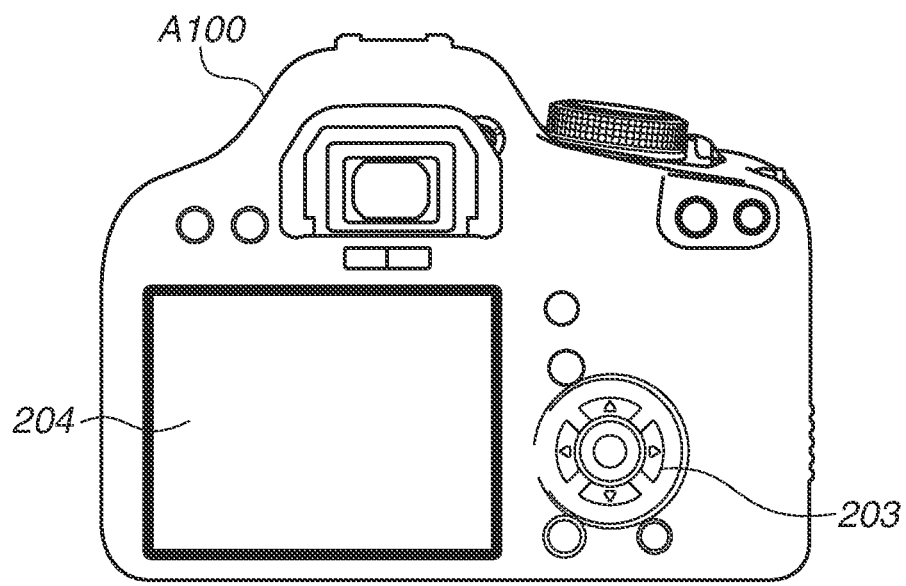

FIGS. 2A and 2B illustrate outer appearances of the digital camera A100. FIG. 2A is a front view of the digital camera A100, to which a lens can be attached, and FIG. 2B is a rear view of the digital camera A100.

An image sensor 201 forms the imaging unit B108.

A shutter button 202 is used to release the shutter. A control button group 203 includes various operation buttons. The shutter button 202 and the control button group 203 form the operation unit B104.

A monitor 204 is, for example, a liquid crystal display and forms the display unit B105. The monitor 204 can also form the operation unit B104 by displaying control icons to enable user operations on the screen.

Figure 3A:
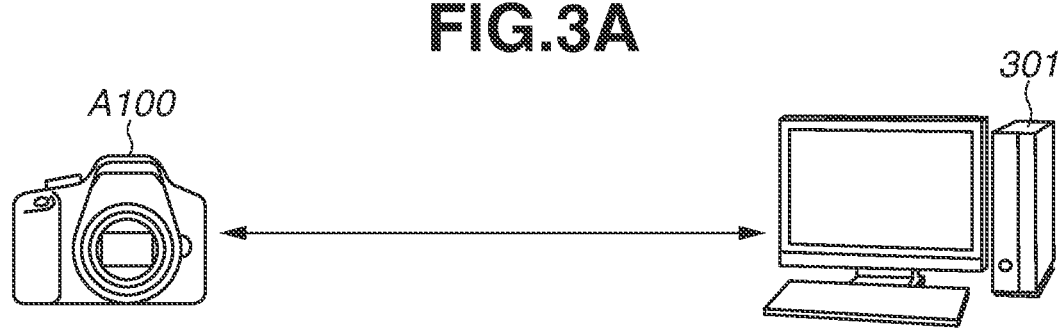
FIGS. 3A, 3B, and 3C illustrate network configurations when using the communication apparatus according to the first exemplary embodiment.
Figure 3B:
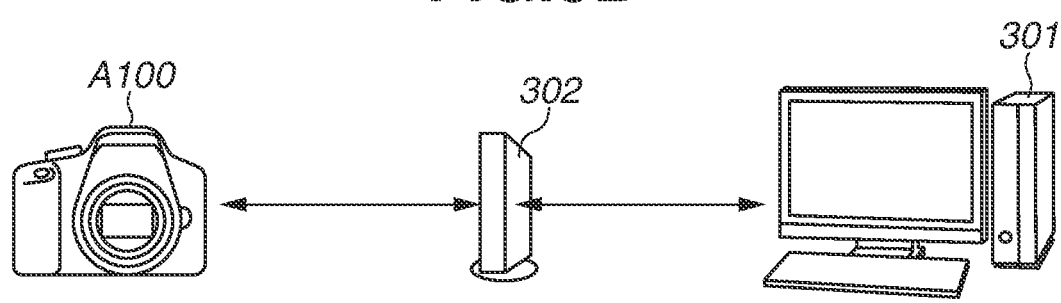
Figure 3C:
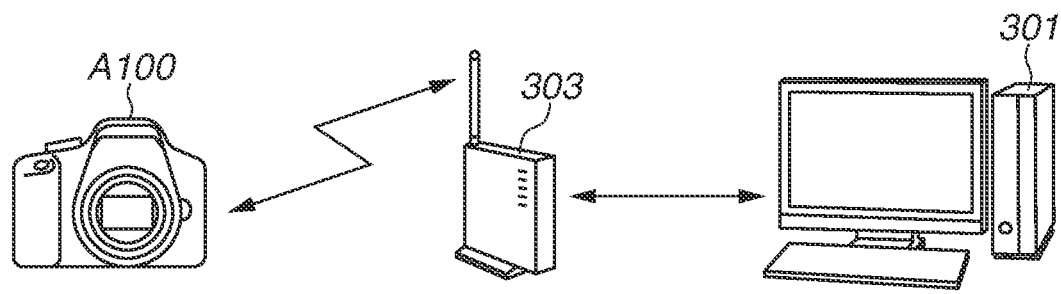

FIGS. 3A, 3B, and 3C illustrate configurations when using the communication function of the digital camera A100. The digital camera A100 communicates with a personal computer 301 as an external apparatus to transmit image data captured by the digital camera A100 to the personal computer 301.

FIG. 3A illustrates an example where the digital camera A100 and the personal computer 301 are directly connected with each other via a wired LAN. More specifically, the wired LAN unit C107 and the communication unit of the personal computer 301 are directly connected via a network cable. If the personal computer 301 has an automatic negotiation function in such a connection configuration, the wired LAN unit C107 can use the automatic negotiation function to detect the communication speeds and modes supported by the personal computer 301 and select the most suitable communication speed and mode before actually starting communication.

FIG. 3B illustrates an example where the digital camera A100 and the personal computer 301 are connected with each other through the wired LAN method via a switching hub 302. More specifically, the wired LAN unit C107 and the communication unit of the switching hub 302 are directly connected with each other via a network cable. The personal computer 301 and the switching hub 302 are connected with each other via a network cable separately. If the switching hub 302 has an automatic negotiation function in such a connection configuration, the wired LAN unit C107 can use the automatic negotiation function to detect the communication speeds and modes supported by the switching hub 302 and select the most suitable communication speed and mode before actually starting communication.

FIG. 3C illustrates an example where the digital camera A100 and the personal computer 301 are connected with each other via an access point 303. More specifically, the wireless LAN unit C108 and the access point 303 communicate with each other by the wireless LAN method. The access point 303 and the personal computer 301 are connected with each other via a network cable separately.

Figure 4A:
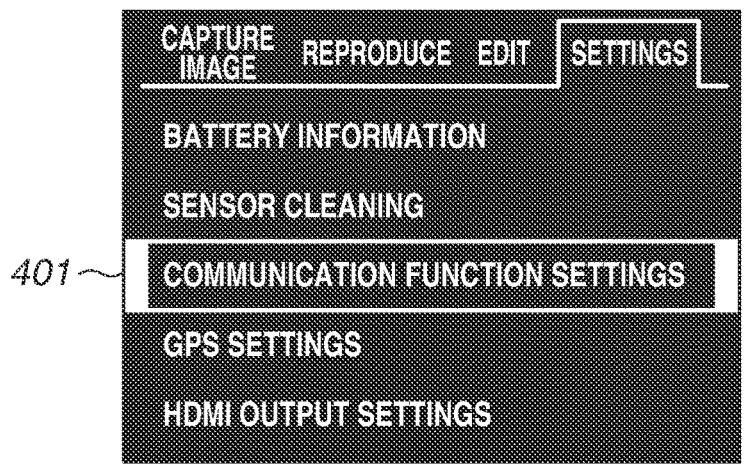
FIGS. 4A, 4B and 4C illustrate graphical user interfaces (GUIs) of the communication apparatus according to the first exemplary embodiment.
Figure 4B:
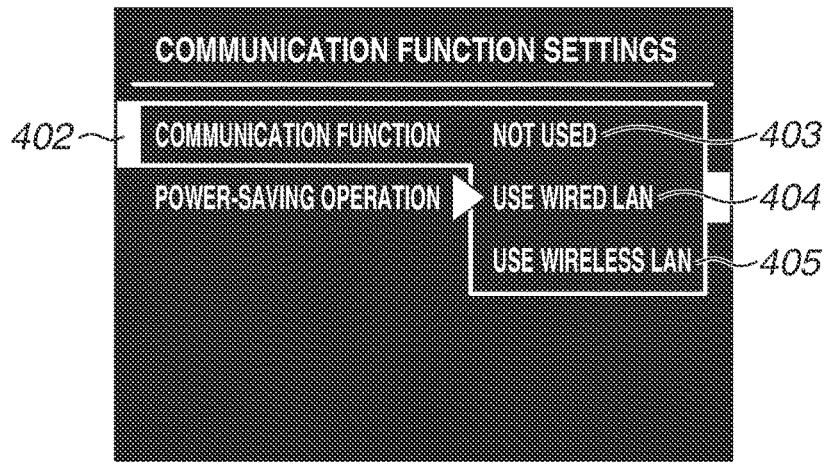
Figure 4C:
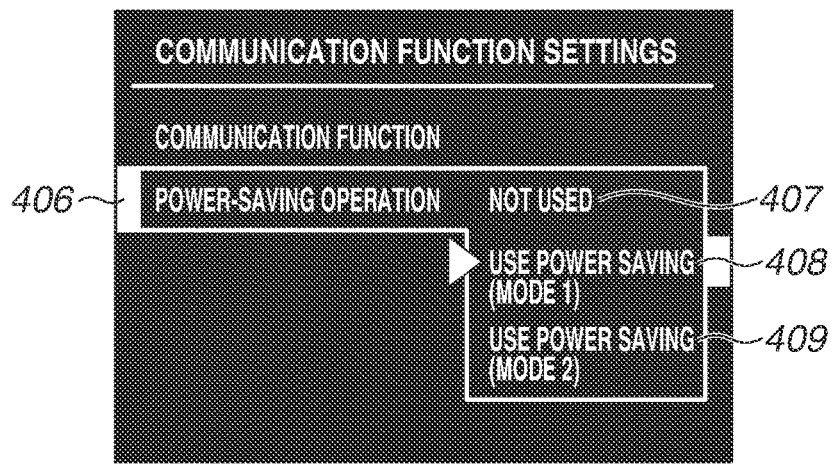

FIGS. 4A, 4B, and 4C illustrate menus for setting operations of the digital camera A100 out of GUIs displayed on the display unit B105 of the digital camera A100.

FIG. 4A illustrates a setting menu screen of the digital camera A100. This screen allows the user to set operations of the communication function by selecting a menu item 401 by using the control button group 203. FIGS. 4B and 4C illustrate communication function setting screens of the digital camera A100, which are displayed when the user selects the menu item 401 in the screen illustrated in FIG. 4A.

FIG. 4B illustrates a communication function setting screen displayed when the user selects "Communication Function" (menu item 402) by using the control button group 203. This screen allows the user to select one of three options for the communication function of the digital camera A100: "Not Used" (menu item 403), "Use Wired LAN" (menu item 404), and "Use Wireless LAN (menu item 405)". More specifically, the screen illustrated in FIG. 4B corresponds to an interface that allows the user to select the communication method to be used by the user for communication.

When the user selects the menu item 403, the digital camera A100 does not transmit image data at the time of still image capturing.

When the user selects the menu item 404, the digital camera A100 operates to transfer image data to a preset external apparatus when still image capturing is performed. In this case, the digital camera A100 transmits image data by using the wired LAN unit C107 as a predetermined communication method.

When the user selects the menu item 405, the digital camera A100 operates to transfer image data to a preset external apparatus when still image capturing is performed. In this case, the digital camera A100 transmits image data by using the wireless LAN unit C108. The wireless LAN unit C108 is a communication method other than the above-described predetermined communication method.

FIG. 4C is another communication function setting screen displayed when the user selects "Power-Saving Operation" (menu item 406) by using the control button group 203. This screen allows the user to select whether to cause the digital camera A100 to reduce the power consumption during execution of the communication function.

When the user selects "Not Used" (menu item 407), the digital camera A100 explicitly disables the communication function of the digital camera A100 or enables the communication function until the power of the digital camera A100 is turned OFF. More specifically, the power output unit B113 continues the power supply to the communication device unit C100.

On the other hand, when the user selects a menu item 408 or 409, the digital camera A100 temporarily disables the communication function of the digital camera A100 if communication with the external apparatus is not performed for a predetermined period of time (e.g., one minute).

When the user selects "Use Power Saving (Mode 1)" (menu item 408), the power output unit B113 stops the power supply to the communication device unit C100 to reduce the power consumption of the entire digital camera A100.

When the user selects "Use Power Saving (Mode 2)" (menu item 409), each component of the communication device unit C100 enters the power-saving state to reduce the power consumption of the communication device unit C100. In this case, the power output unit B113 does not stop the power supply to the communication device unit C100.

When the menu item 409 is selected, the digital camera A100 operates in Mode 2. In this mode, the communication device unit C100 stops the clock of the CPU C101, shifts the memory C102 to the low-power mode (self-refresh mode), and stops the power supply to the high-speed I/F unit C105, the wired LAN unit C107, and the wireless LAN unit C108, thus reducing the power consumption.

<Descriptions of Operations>

Operations of the digital camera A100 will be described below with reference to the flowcharts illustrated in FIGS. 5 and 6 and the timing charts illustrated in FIGS. 7A, 7B, and 7C.

Operations of the camera device unit B100 and the communication device unit C100 after the digital camera A100 performs an image capturing operation and generates image data, will be described.

Figure 5:
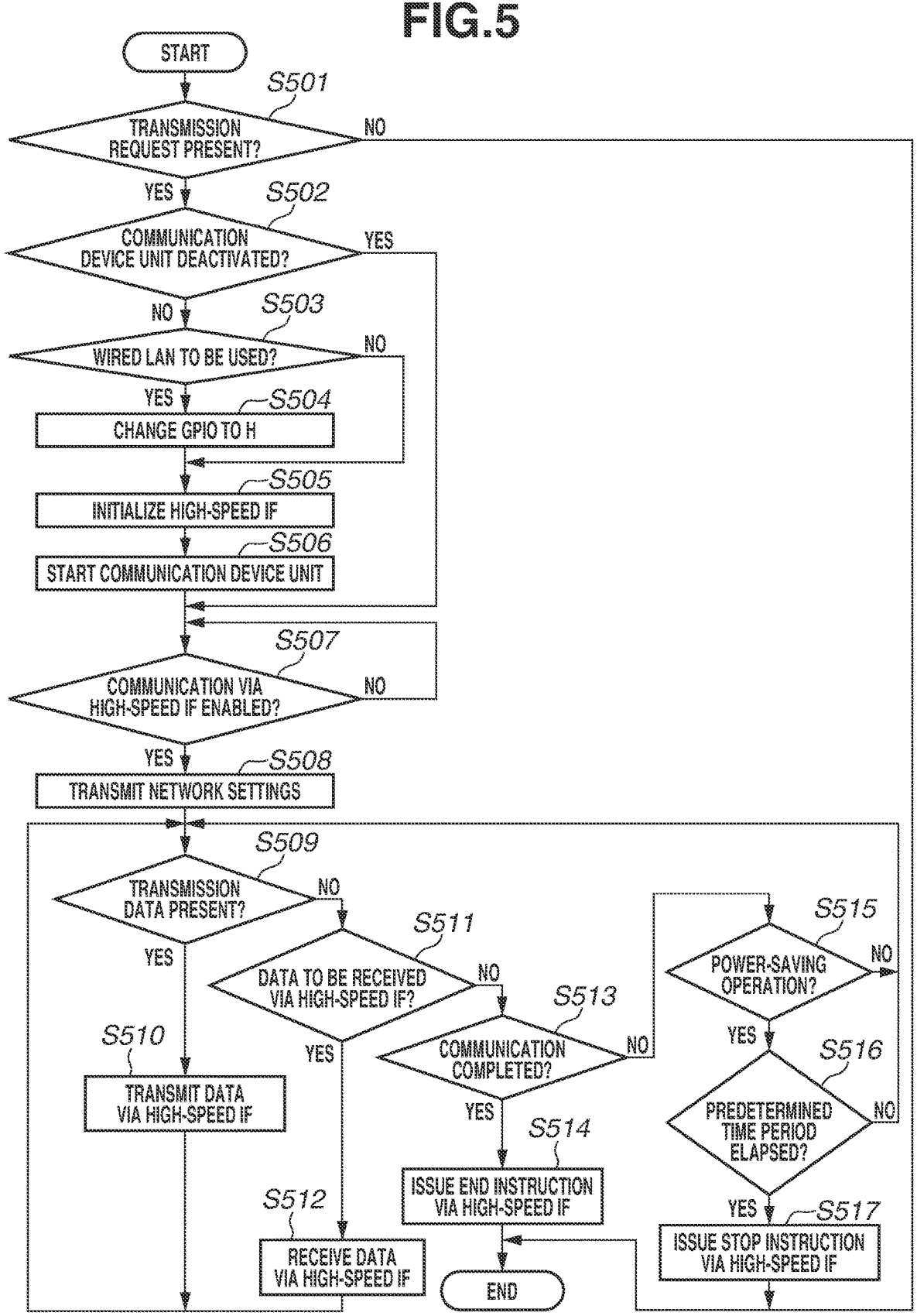
FIG. 5 is a flowchart illustrating an operation of the communication apparatus according to the first exemplary embodiment.

FIG. 5 is a flowchart illustrating operations of the camera device unit B100.

In S501, the CPU B101 determines whether there is a request for transmitting captured image data to an external apparatus. More specifically, referring to FIG. 4B, the CPU B101 determines that there is no transmission request when the menu item 403 is selected, and that there is a transmission request when the menu item 404 or 405 is selected. When there is a request for transmitting image data (YES in S501), the processing proceeds to S502. On the other hand, when there is no request (NO in S501), the processing exits this flowchart.

In S502, the CPU B101 determines whether the communication device unit C100 is in the non-operating (deactivated) state. More specifically, when the communication device unit C100 is in the power-off or the power-saving state, i.e., when the CPU B101 determines that the communication device unit C100 is in the non-operating (deactivated) state (YES in S502), the processing proceeds to S503. In the power-off state, the power output unit B113 does not output power to the communication device unit C100. In the power-saving state, the power output unit B113 outputs power to the communication device unit C100 but each unit of the communication device unit C100 is in the power-saving state. On the other hand, when the communication device unit C100 is in neither the power-off nor the power-saving state, i.e., when the CPU B101 determines that the communication device unit C100 is operating (NO in S502), the processing proceeds to S507.

In S503, the CPU B101 determines whether to transmit image data via a wired LAN. More specifically, when the menu item 404 illustrated in FIG. 4B is selected, i.e., when the wired LAN is used to transmit image data (YES in S503), the processing proceeds to S504. On the other hand, when the menu item 405 illustrated in FIG. 4B is selected, i.e., when the wireless LAN, not the wired LAN, is used to transmit image data (NO in S503), the processing proceeds to S505.

In S504, the CPU B101 controls the GPIO output unit B110 to change to High the signal level of the GPIO connection indicating the use of the wired LAN unit C107 out of the GPIO connections to the input unit C104.

In S505, the CPU B101 controls (initializes) the high-speed I/F unit B111 to enable communication with the high-speed I/F unit B111. More specifically, the CPU B101 cancels the reset state of the high-speed I/F unit B111 and supplies a clock required for operations.

In S506, the CPU B101 activates the communication device unit C100 that has been determined to be in the non-operating (deactivated) state in S502, to restart operations of the communication device unit C100. For example, when the communication device unit C100 is in the power-off state, the CPU B101 controls the power output unit B113 to supply the electric power which is output by the battery B112 via the power output unit B113 to the power input unit C106.

When the communication device unit C100 is in the power-saving state, the CPU B101 controls the GPIO output unit B110 to change the voltage level of the GPIO connection to return the communication device unit C100 from the power-saving state. These processings cause the communication device unit C100 to start operating and perform operations according to the flowchart illustrated in FIG. 6.

In S507, the CPU B101 waits until communication with the communication device unit C100 is enabled through the high-speed I/F unit B111.

In S508, the CPU B101 communicates with the communication device unit C100 via the high-speed I/F unit B111 and transmits information required for network setting. The information required for network settings includes the network type to be used (wired LAN or wireless LAN) and the Internet Protocol (IP) address setting (a fixed setting or Dynamic Host Configuration Protocol (DHCP)). When the wireless LAN is used, this information also includes Service Set Identifier (SSID) of the access point to be connected and a password. When the communication device unit C100 returns from the power-saving state in S506, this operation can be omitted because the communication device unit C100 has already the network settings.

In S509, the CPU B101 determines whether there is data to be transmitted to an external apparatus by using the communication device unit C100. When there is data to be transmitted (YES in 509), the processing proceeds to S510. On the other hand, when there is no data to be transmitted (NO in S509), the processing proceeds to S511.

In S510, the CPU B101 transfers the data to be transmitted to the external apparatus, to the communication device unit C100 via the high-speed I/F unit B111. For example, the CPU B101 transfers image data generated in image capturing before starting the flowchart illustrated in FIG. 5. In this case, the CPU B101 may transfer information (IP address, forwarding address, user name, and password) about the transmitting destination which is the external apparatus together with the image data.

In S511, the CPU B101 confirms the status of the high-speed IF unit B111 to determine whether the communication device unit C100 is going to transmit the data to the camera device unit B100. When the communication device unit C100 is going to transmit the data (YES in S511), the processing proceeds to S512.

In S512, the CPU B101 receives the data from the communication device unit C100 via the high-speed I/F unit B111. Examples of the data to be received include status information indicating whether the data transferred to the communication device unit C100 in S510 has been transmitted to the external apparatus.

In S513, the CPU B101 determines whether the communication function setting illustrated in FIG. 4B is changed to the menu item 403 "Not Used". When the menu item 403 is selected, i.e., when communication with the external apparatus is not subsequently performed (YES in S513), the processing proceeds to S514. In S514, the CPU B101 ends the operation of the communication device unit C100. On the other hand, when the menu item 403 is not selected (NO in S513), the processing proceeds to S515 to subsequently perform communication with the external apparatus. In S515 to continue the processing.

In S514, the CPU B101 ends the operation of the communication device unit C100. More specifically, the CPU B101 transmits an end command to the communication device unit C100 via the high-speed I/F unit B111. Subsequently, the CPU B101 controls the power output unit B113 to stop the power supply to the communication device unit C100. Then, the processing exits the flowchart.

In S515, the CPU B101 determines whether the power-saving operation is to be performed based on the power-saving operation setting illustrated in FIG. 4C.

When "Not Used" (menu item 407) is selected, i.e., when the power-saving operation is not performed (NO in S515), the processing returns to S509. In S509, the CPU B101 confirms whether the next transmit data exists. When the menu item 408 or 409 is selected, i.e., when the power-saving operation is to be performed (YES in S515), the processing proceeds to S516.

In S516, the CPU B101 determines whether to shift the communication device unit C100 to the power-saving mode, based on the elapsed time since the data transmission is performed in S510. When the predetermined time (e.g., one minute) has elapsed (YES in S516), the processing proceeds to S517. On the other hand, when the predetermined time has not elapsed (NO in S516), the processing returns to S509. In S509, the CPU B101 confirms whether the next transmit data exists.

In S517, based on the menu item selected in FIG. 4C, the CPU B101 changes the communication device unit C100 to the power-off or the power-saving state. Then, the processing exits this flowchart.

More specifically, when the menu item 408 is selected, the CPU B101 performs processing similar to that in S514 and stops the power supply to the communication device unit C100 (to turn OFF the power of the communication device unit C100). On the other hand, when the menu item 409 is selected, the CPU B101 instructs the communication device unit C100 to shift each unit of the communication device unit C100 to the power-saving state, via the high-speed I/F unit B111. Upon reception of the instruction, the communication device unit C100 stops the clock of the CPU C101, shifts the memory C102 to the low-power mode (self-refresh mode), and stops the power supply to the high-speed I/F unit C105, the wired LAN unit C107, and the wireless LAN unit C108, thus reducing the power consumption.

FIG. 6 is a flowchart illustrating operations of the communication device unit C100.

The flowchart illustrated in FIG. 6 is executed when the communication device unit C100 restarts an operation based on the processing in S506. More specifically, when the communication device unit C100 is in the power-off state, the power output unit B113 starts the power supply to the power input unit C106 to turn ON the power of the communication device unit C100. Then, the communication device unit C100 starts the flowchart. When the communication device unit C100 is in the power-saving state, the voltage level of the GPIO connection in the GPIO input unit C104 is changed that returns the communication device unit C100 from the power-saving state, and an interrupt of activation is generated for the CPU C101. Then, the communication device unit C100 starts the present flowchart.

In S601, the CPU C101 controls the GPIO input unit C104 to acquire the signal level of the GPIO connection indicating the use of the wired LAN unit C107. The GPIO connection that acquired the signal level is connected to the GPIO connection operated in S504. Therefore, when the signal level of the GPIO connection of the GPIO output unit B110 is changed to High in S504, the signal level of the GPIO connection acquired in S601 is also changed to High. When the acquired signal level is High (YES in S601), the processing proceeds to S602. On the other hand, when the acquired signal level is Low (NO in S601), the processing proceeds to S603.

In S602, the CPU C101 controls the wired LAN unit C107 to enable the operation of the wired LAN unit C107. More specifically, the CPU C101 supplies power to the wired LAN unit C107 to cancel the reset state. If the wired LAN unit C107 is connected to the communication partner as in the configurations illustrated in FIGS. 3A and 3B, for example, the above-described processing enables the wired LAN unit C107 to start the automatic negotiation processing.

In S603, the CPU C101 enables the operation of the entire communication device unit C100 to perform the subsequent processing. For example, when the communication device unit C100 starts the flowchart after turning ON the power of the communication device unit C100 from the power-off state, then in S603, the CPU C101 loads from the nonvolatile memory C103 a program and data required for operations of the communication device unit C100, into the memory C102, and starts controlling the entire communication device unit C100.

The firmware configuration of the communication device unit C100 includes a boot loader which performs only basic hardware initialization for quick activation, and system software which is loaded into memory by the boot loader and initializes the entire system. In the configuration, the processing in S601 to S602 is executed by the boot loader, and the processing in S603 and subsequent operations is executed by the system software.

On the other hand, when the communication device unit C100 starts the flowchart after returning from the power-saving state, in S603, the CPU C101 performs processing for returning each unit of the communication device unit C100 from the power-saving state. For example, the CPU C101 performs processing for returning the memory C102 from the self-refresh mode or restarting the power supply to the high-speed I/F unit C105.

The processing in S601 to S602 is executed by the system software of the communication device unit C100 in interrupt processing for returning from the power-saving state. The processing in S603 and subsequent operations is executed by normal system software.

In S604, the CPU C101 controls the high-speed I/F unit C105 and waits until communication with the camera device unit B100 is enabled. S604 corresponds to S507 illustrated in FIG. 5.

In S605, the CPU C101 receives the network settings from the camera device unit B100 via the high-speed I/F unit C105. The information required for network settings includes the network type to be used (wired LAN or wireless LAN) and the Internet Protocol (IP) address setting (a fixed setting or Dynamic Host Configuration Protocol (DHCP)). When the wireless LAN is used, the information also includes Service Set Identifier (SSID) of the access point to be connected and a password. S605 corresponds to S508 illustrated in FIG. 5. When the communication device unit C100 starts the flowchart after returning from the power-saving state, this operation may be omitted since the communication device unit C100 has already the network settings.

In S606, the CPU C101 determines whether to perform communication by using the wired LAN unit C107, based on the network settings received in S605. When the wired LAN unit C107 is to be used (YES in S606), the processing proceeds to S607. On the other hand, when the wired LAN unit C107 is not to be used (NO in S606), the processing proceeds to S608.

In S607, the CPU C101 acquires the status of the wired LAN unit C107 and waits for completion of the automatic negotiation processing started in S602.

In S608, the CPU C101 controls the wireless LAN unit C108 to establish a wireless LAN connection between the wireless LAN unit C108 and the access point.

In S609, the CPU C101 sets the wired LAN unit C107 or the wireless LAN unit C108 based on the network settings acquired in S605. For example, if the IP address is specified as a network setting, the CPU C101 applies the specified IP address to the wired LAN unit C107 or the wireless LAN unit C108.

In S610, the CPU C101 confirms the status of the high-speed I/F unit C105 and performs processing in S611 to S615 depending on the status.

S611 corresponds to S510 illustrated in FIG. 5. This processing is performed when the high-speed I/F unit C105 receives data to be transmitted to the external apparatus, from the camera device unit B100. In S611, the CPU C101 transmits the data received via the high-speed I/F unit C105 (the data transmitted by the camera device unit B100 in S510) to the external apparatus by using the wired LAN unit C107 or the wireless LAN unit C108.

Processing in S612 to S613 is performed when the high-speed IF unit C105 has not received the data from the camera device unit B100.

In S612, the CPU C101 determines whether the wired LAN unit C107 or the wireless LAN unit C108 has received the data from the external apparatus. For example, when data transmission to the external apparatus is completed in S610, the CPU C101 receives status information (transmission completed) from the external apparatus. When the data is received from the external apparatus (YES in S612), the processing proceeds to S613. On the other hand, when the data is not received from the external apparatus (NO in S612), the processing returns to S610.

In S613, the CPU C101 transmits the data received by the wired LAN unit C107 or the wireless LAN unit C108 from the external apparatus, to the camera B100 by using the high-speed I/F unit C105. This processing corresponds to S511 and S512 illustrated in FIG. 5.

S614 corresponds to S514 illustrated in FIG. 5. The CPU C101 performs the processing when the high-speed I/F unit C105 receives an end instruction from the camera device unit B100. In S614, the CPU C101 stops operations of the entire system, for example, by deactivating the wired LAN unit C107 or the wireless LAN unit C108 to stop the power supply to the power input unit C106. Then, the processing exits the flowchart.

S615 corresponds to S517 illustrated in FIG. 5. The CPU C101 performs this processing when the high-speed I/F unit C105 receives a stop instruction from the camera device unit B100. In S615, the CPU C101 changes the operation state of the communication device unit C100 based on the selected menu item illustrated in FIG. 4C. Then, the processing exits this flowchart.

More specifically, when the menu item 408 is selected, the CPU C101 performs processing similar to that in S614 to stop operations of the entire system. On the other hand, when the menu item 409 is selected, the CPU C101 stops the clock of the CPU C101, shifts the memory C102 to the low-power mode (self-refresh mode), and stops the power supply to the high-speed I/F unit C105, the wired LAN unit C107, or the wireless LAN unit C108, thus reducing the power consumption (power-saving state).

Figure 7A:
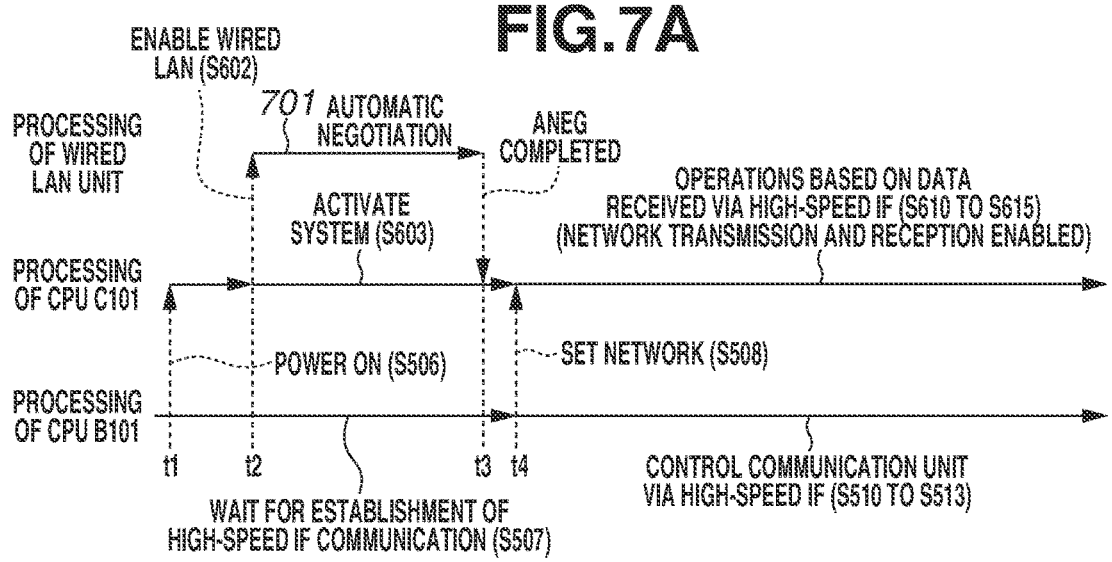
FIGS. 7A, 7B and 7C are timing charts illustrating operation timings of the communication apparatus according to the first exemplary embodiment.
Figure 7B:
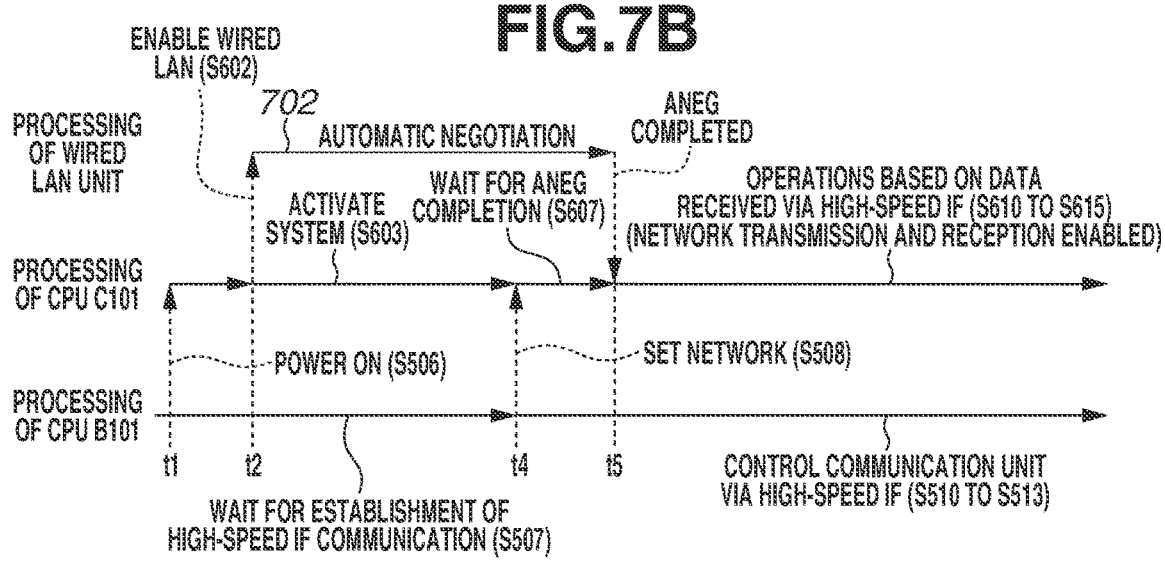

FIGS. 7A and 7B are timing charts illustrating operations of the digital camera A100 from the time when the power of the communication device unit C100 is turned ON until the time when the communication device unit C100 communicates with the external apparatus via the wired LAN. FIG. 7C is a timing chart illustrating effects of an example embodiment.

Figure 7C:
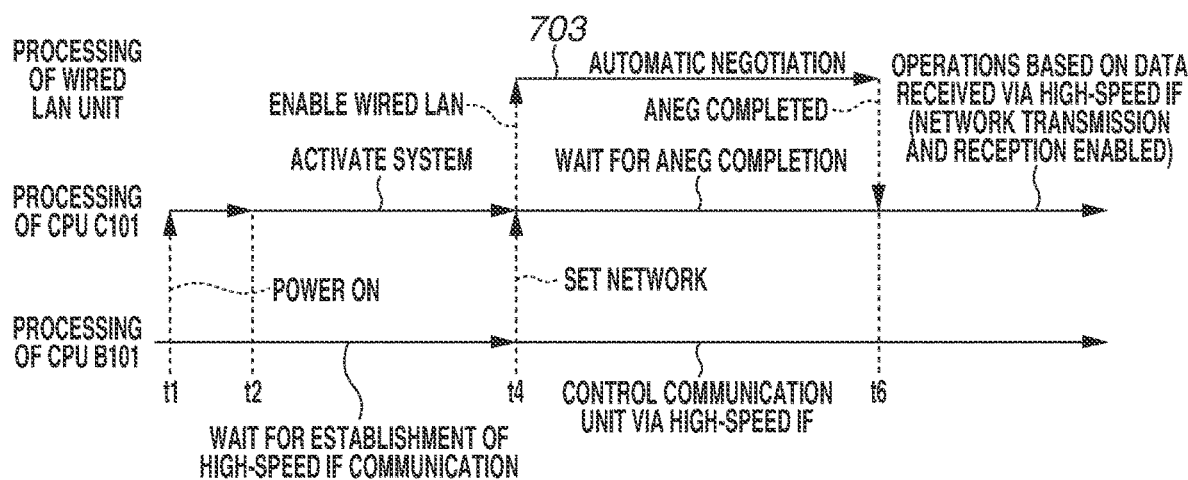

Referring to each of FIGS. 7A to 7C, the horizontal axes indicate elapsed time, the bottom axis indicates processing of the CPU B101 in the camera device unit B100, the middle axis indicates processing of the CPU C101 in the communication device unit C100, and the top axis indicates execution timing of processing of the wired LAN unit C107 in the communication device unit C100.

Referring to FIGS. 7A and 7B, at timing t1, the camera device unit B100 turns ON power of the communication device unit C100, which corresponds to S506. Subsequently, the camera device unit B100 waits until communication with the communication device unit C100 is enabled through the high-speed I/F unit B111, which corresponds to S507. When power is tuned ON and the communication device unit C100 starts operating, the CPU C101 enables the wired LAN unit C107 based on the state of the GPIO input unit C104, which corresponds to S601 and S602. Subsequently, the CPU C101 activates the entire system and waits until communication with the camera device unit B100 is enabled through the high-speed I/F unit C105, which corresponds to S603 and S604. When the wired LAN unit C107 is enabled at timing t2, the wired LAN unit C107 starts the automatic negotiation processing 701 or 702. The automatic negotiation processing can be performed concurrently with the processing of the CPU C101.

FIG. 7A illustrates a case where the automatic negotiation processing 701 requires a short time, and the automatic negotiation processing 701 ends at timing t3 that is earlier than timing t4 when communication between the high-speed I/F unit B111 and the high-speed I/F unit C105 is enabled. In such a case, the digital camera A100 can communicate with the external apparatus via the wired LAN immediately after the timing t4.

FIG. 7B illustrates a case where the automatic negotiation processing 702 requires a longer time, and the automatic negotiation processing 702 ends at timing t5 that is later than the timing t4 when communication between the high-speed I/F unit B111 and the high-speed I/F unit C105 is enabled. In such a case, the CPU C101 waits for completion of the automatic negotiation processing 702 between the timings t4 and t5, which corresponds to S607. Then, the digital camera A100 can communicate with the external apparatus by using the wired LAN at or after the timing t5.

FIG. 7C illustrates a case where an embodiment is not applied. In this case, the digital camera A100 makes a network setting after communication between the communication device unit C100 and the camera device unit B100 is enabled through the high-speed I/F (at or after the timing t4). At that time, the CPU C101 recognizes that the wired LAN unit C107 is to be used, and initializes the wired LAN unit C107. Automatic negotiation processing 703 starts in response to the initialization. When the automatic negotiation processing 703 is completed at timing t6, communication with the external apparatus is enabled through the wired LAN.

As illustrated in these timing charts, if an embodiment is applied, the timing when communication with the external apparatus is enabled through the wired LAN, can be accelerated, from the timing t6 to the timing t4 or t5.

The present exemplary embodiment makes it possible to offer a communication apparatus capable of notifying of the use of the wired LAN by a GPIO signal. The notification is made when a communication request occurs in a state where the communication through the wired LAN is set, and the communication apparatus is turned ON or returned from the non-operating state (power-saving state) to the operating state.

If the use of the wired LAN is notified from the camera device unit B100 by a GPIO signal when the communication apparatus returns to the operating state, the automatic negotiation can be started before the entire communication apparatus is activated.

Therefore, when communication is carried out immediately after the communication apparatus returns from the non-operating state, the time until communication is enabled can be shortened by concurrently performing the processing for activating the communication apparatus and the automatic negotiation processing.

A second exemplary embodiment will be described below.

A digital camera A100 as a communication apparatus according to the second exemplary embodiment basically has the same configuration as the first exemplary embodiment, but differs in a controlling method when activating the communication apparatus in the non-operating state. The present exemplary embodiment will be described below centering on the controlling method different from the first exemplary embodiment, and descriptions about common processing will be omitted.

Figure 8:
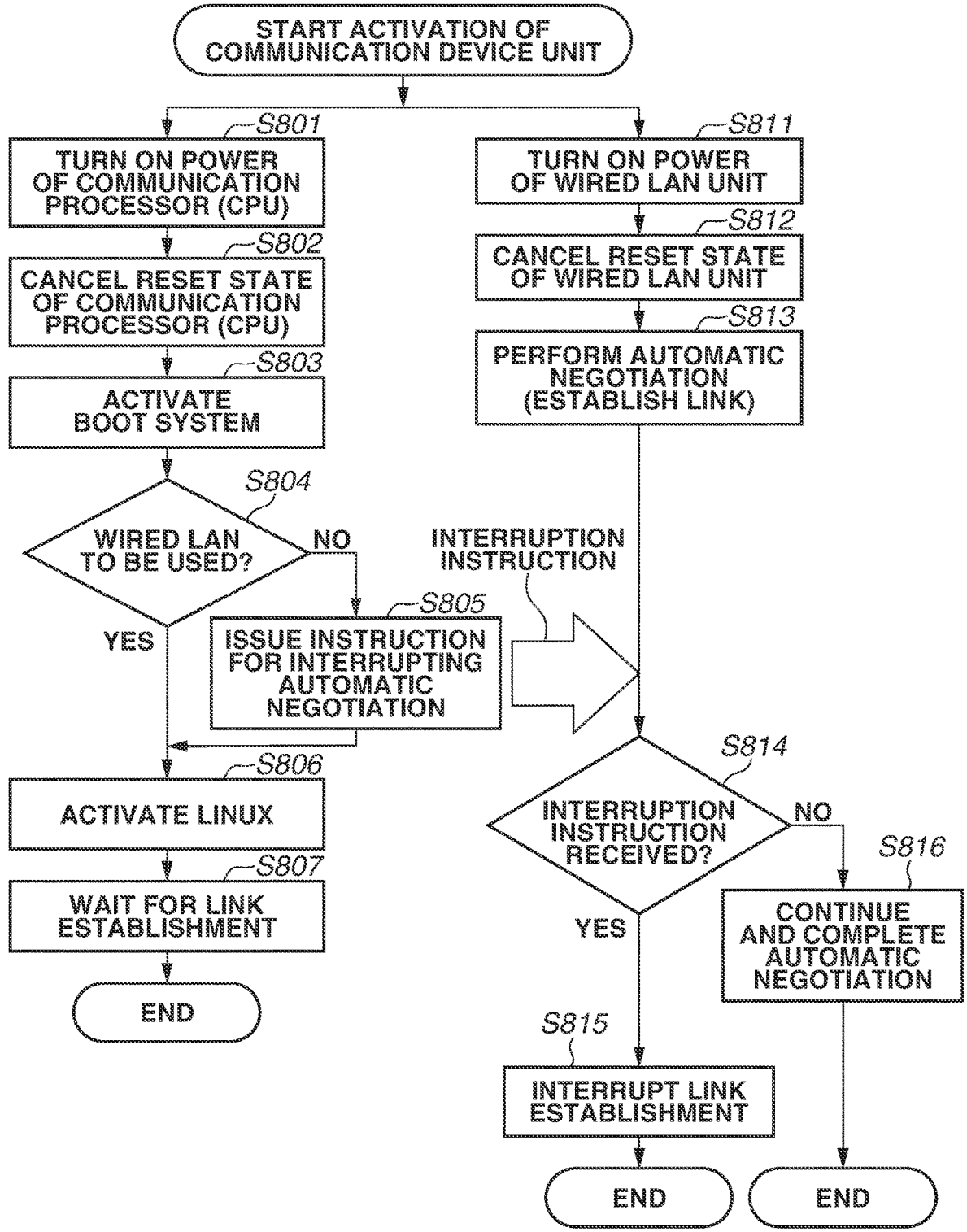
FIG. 8 is a flowchart illustrating an operation of a communication apparatus according to a second exemplary embodiment.

FIG. 8 is a flowchart illustrating operations of the digital camera A100 according to the second exemplary embodiment.

The flowchart illustrated in FIG. 8 shows the operation for supplying power to the communication device unit C100 to activate the device. The left-hand side of the flowchart indicates the sequence for activating the communication device unit C100, and the right side of the flowchart indicates the sequence for activating the wired LAN unit C107.

Firstly, the power of the communication device unit C100 is turned ON to start the power supply from the power output unit B113. In S801, the supplied power turns ON the power of the CPU C101 serving as the communication processor of the communication device unit C100.

In S811, the supplied power also turns ON the power of the wired LAN unit C107 connected to the power source at the same time, and starts the power supply.

When the power of the CPU C101 rises up to the sufficient specified voltage and the unit internally stabilizes, then in S802, the CPU C101 cancels the reset state of the CPU C101. Thus, the activating sequence of the communication processor is started.

In parallel with the activating sequence, when the power of the wired LAN unit C107 rises up to the sufficient specified voltage and the unit internally stabilizes, then in S812, the CPU C101 cancels the reset state of the wired LAN unit C107 and executes the starting sequence of the wired LAN unit C107.

The timing that the reset state is canceled is determined based on the physical circuit specifications of the communication processor and Ethernet.

After the reset state is canceled, in S803, the communication processor activates the boot system for operating the communication processor with the minimum system configuration. If the communication processor uses a large-scale operating system (OS), such as Linux®, the activation of the OS requires certain time. Therefore, the communication processor first activates the boot system with the minimum system configuration and then activates the OS (Linux). According to the present exemplary embodiment, when the communication processor is activated, the communication processor activates the wired LAN unit C107 to start the automatic negotiation and starts the setting sequence. Then, the communication processor receives from the camera device unit B100 a notification about whether to use the wired LAN (Ethernet) for communication via the dedicated communication line (GPIO).

In S804, the communication processor determines whether to use the wired LAN (Ethernet) based on the signal received through the GPIO connection. If the wired LAN is to be used (YES in S804), the processing proceeds to S806. In S806, the communication processor activates the OS to prepare for the start of communication. In S807, the communication processor waits until a link is established through the automatic negotiation.

On the other hand, when the wired LAN is not to be used (NO in S804), the processing proceeds to S805. In S805, the communication processor transmits an interrupting instruction to the wired LAN unit C107 to interrupt the link establishment through the automatic negotiation. The link establishment sequence through the automatic negotiation can be interrupted by using any one or some of the following methods: turning OFF the power of the wired LAN unit C107, transmitting a reset signal from the camera device unit B100 or the communication processor to the wired LAN unit C107 to reset the wired LAN unit C107, communicating with the communication processor to transmit a stop signal, and shifting the communication device unit C100 to the power-saving state to disable the function of communicating with an external apparatus.

Subsequently, in S806, the communication processor starts the activation of the OS (Linux) like the case where the wired LAN is used (YES in S804). Since the wired LAN is not subsequently used, another communication unit (e.g., the wireless LAN unit C108) starts the starting sequence. In S807, the communication processor waits until a link is established by the other communication unit.

Another method is possible if there is a plurality of communication units including the wired LAN unit C107 and the wireless LAN unit C108. In this method, all of the communication units are activated at the same time to establish links, and, when a unit to be used for communication is determined, the links established by the communication units are stopped except for the link established by the communication unit to be used. This method makes it possible to obtain an effect of shortening the time until starting communication whichever communication unit is used for communication.

Still another method is possible, in which one communication unit to be preferentially used is activated first and other communication units are subsequently activated as required. In a case where the time required for the activation and link establishment largely differs between communication units (between communication methods) and a communication unit is provided that can complete the activation and link establishment in such a short time that the user does not care, the communication unit may be subsequently activated as required. In other words, communication units requiring a longer time to complete the activation and link establishment may be activated in advance.

After the reset state of the wired LAN unit C107 is canceled in S812, in S813, the wired LAN unit C107 executes the starting sequence independently of the communication processor to start the link establishment, i.e., the automatic negotiation. Processing for establishing a link through the automatic negotiation is referred to as a setting sequence.

When the wired LAN unit C107 receives an instruction for interrupting the link establishment from the communication processor during execution of the automatic negotiation (YES in S814), the processing proceeds to S815. In S815, the wired LAN unit C107 interrupts the link establishment. If the automatic negotiation has already been completed, the wired LAN unit C107 cancels the communication settings made through the automatic negotiation and disconnects the link.

On the other hand, when the wired LAN unit C107 does not receive an instruction for interrupting the link establishment from the communication processor (NO in S814), the processing proceeds to S816. In S816, the wired LAN unit C107 continues and completes the automatic negotiation.

Thus, the communication processor and the wired LAN unit C107 are activated at the same time to concurrently perform the starting sequence of the communication processor and the setting sequence of the wired LAN unit C107. The method makes it possible to complete the automatic negotiation on Ethernet in a shorter time and start communication earlier than the conventional procedure in which the two sequences are sequentially processed.

In addition, the communication processor and the wired LAN unit C107 do not need to be activated at the same time. More specifically, the wired LAN unit C107 is activated before the communication processor becomes able to determine whether the wired LAN is to be used, so that an effect of shortening the time until the automatic negotiation on Ethernet is completed, can be obtained.

Further, when the wired LAN is not used, the link establishment through the automatic negotiation on Ethernet is interrupted as soon as the communication processor becomes able to determine whether to use the wired LAN, so that an increase in unnecessary power consumption can be suppressed.

When the camera device unit B100 communicates with the CPU C101 serving as the communication processor, PCI Express® may be used, which makes it possible to omit a signal (GPIO terminal) dedicated for state notification. After the OS (Linux) is activated in S806, the camera device unit B100 informs the communication processor through PCI Express communication, of the communication unit to be used, then in S804, the communication processor determines whether to use the wired LAN. Thus, the dedicated signal line may be omitted. With such a system, the number of ports to be used by the camera device unit B100 can be reduced and the ports can be assigned to other functions, or the degree of design freedom is improved and the cost can be reduced.

A third exemplary embodiment will be described below.

The second exemplary embodiment described above centers on an example where the wired LAN (Ethernet) is used as a specific communication method. However, a communication method other than the wired LAN can also obtain a similar effect as long as the method establishes a link before performing data communication. Some embodiments are applicable to a configuration based on a link establishment system with an independent link establishment unit, for example, Universal Serial Bus (USB®) standard, PCI® standard, Wi-Fi® standard, High-Definition Multimedia Interface (HDMI®) standard, DisplayPort® standard, and Mobile Industry Processor Interface (MIPI®) standard.

The third exemplary embodiment is configured based on the USB3.0 standard.

Figure 9:
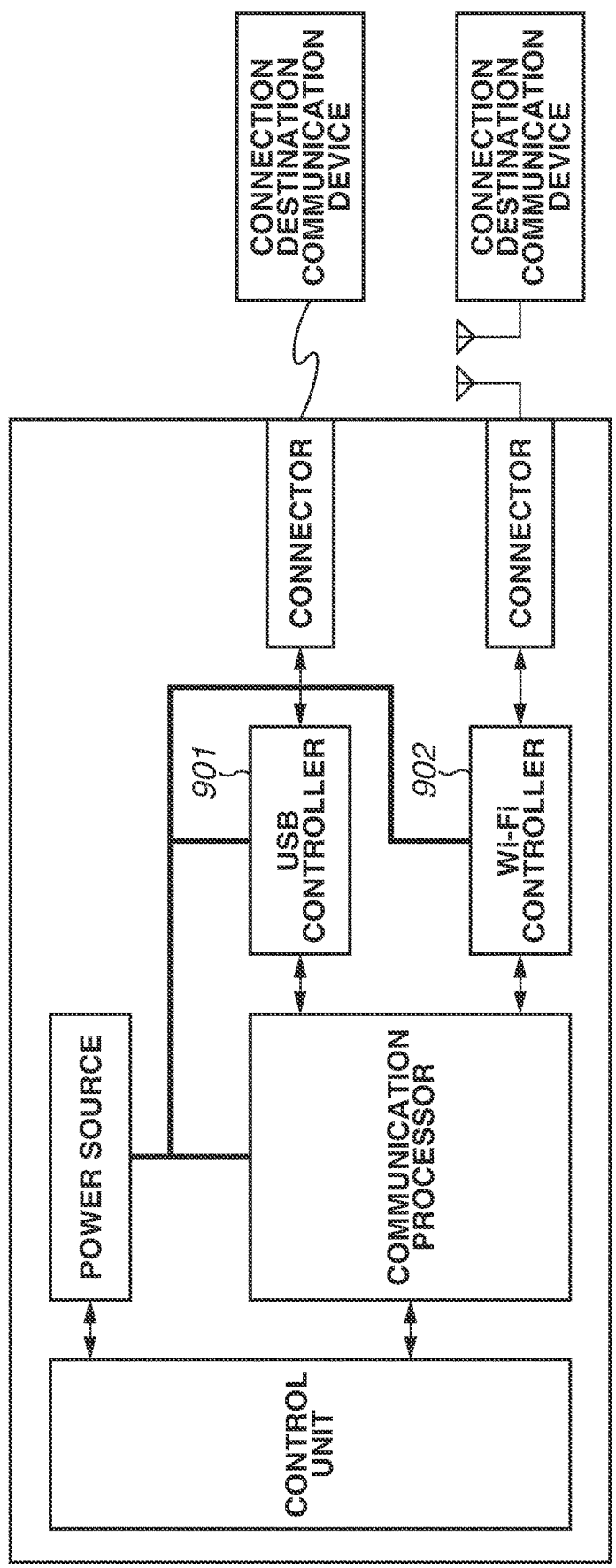
FIG. 9 illustrates a configuration of a communication apparatus according to a third exemplary embodiment.

FIG. 9 illustrates a simplified configuration of the communication apparatus according to the present exemplary embodiment.

As communication devices, a USB controller 901 in lieu of the wired LAN unit C107, and a Wi-Fi controller 902 as the wireless LAN unit C108 can be used. According to the second exemplary embodiment, the wired LAN unit C107 is provided with Physical Layer (PHY) for communication, and the communication processor is provided with the Media Access Control (MAC) function. According to the present exemplary embodiment, the apparatus is not configured with PHY and MAC. Instead of PHY and MAC, the apparatus is configured with a communication control portion including PHY and having the MAC function, and the communication processor connected thereto. The configuration for obtaining effects of some embodiments is characterized in that the portion for establishing a link with the connection destination communication apparatus is separated from the portion having the data to be transmitted to the connection destination.

FIG. 10 illustrates a sequence from the start of the activation of the communication apparatus according to the present exemplary embodiment, until the link establishment. The left-hand side of the flowchart indicates the sequence of the communication processor and the right-hand side of the flowchart indicates the sequence of the USB controller. Operations of the communication processor are similar to the operations illustrated in FIG. 8.

Firstly, in S901, the supplied power turns ON the power of the communication processor. In S911, at almost the same timing, the supplied power turns ON the power of the USB controller and VBUS power is also supplied.

When the power of the communication processor rises up to the sufficient specified voltage and the unit internally stabilizes, then in S902, the communication processor cancels the reset state and executes the starting sequence in the communication processor.

The USB controller also starts the starting sequence in parallel. Firstly, in S912, the USB controller performs receiver detection. In S913, the USB controller sequentially performs link training, address setting, and configuration as the link establishment sequence.

After the reset state is canceled, in S903, the communication processor activates the boot system for operating the communication processor with the minimum system. Firstly, the communication processor activates the boot system with the minimum configuration. Then, the communication processor receives a notification indicating whether to use the USB controller through the control unit and the dedicated communication line (GPIO).

In S904, based on the notification from the control unit, the communication processor determines whether to use USB controller. When the USB controller is to be used (YES in S904), the processing proceeds to S906. In S906, the communication processor starts the OS (Linux) to prepare for the start of communication via the USB controller. In S907, the communication processor waits until a USB link is established.

When the USB controller is not to be used (NO in S904), the processing proceeds to S905. In S905, the communication processor transmits an instruction for interrupting the link establishment to the USB controller. Subsequently, in S906, the communication processor starts the activation of the OS (Linux) same as the case where the USB controller is to be used (YES in S904). Since the USB controller is not to be subsequently used, the communication processor transmits an activation instruction to another communication device (Wi-Fi controller). In S907, the communication processor waits until a Wi-Fi link is established.

Another method is possible if there is a plurality of communication devices. In this case, all of the communication devices are activated at the same time to establish links, and, when a communication device to be used for communication is determined, the communication devices are stopped except for the determined communication device. However, since activating a plurality of communicating devices at the same time increases the peak current, it is more desirable to first activate the communication device that is to be preferentially used and then subsequently activate other communication devices as required. The communication device to be preferentially used may be predetermined or, after detecting whether a communication cable is connected, the communication device to be used may be selected according to whether the cable is connected.

In S913, the USB controller executes the starting sequence independently of the operation of the communication processor to start link establishment.

In a case where during link establishment or after completion of link establishment, the instruction for interrupting the link establishment (S905) is received from the communication processor (YES in S914), the processing proceeds to S915. In S915, the USB controller interrupts the link establishment. If the link establishment is completed, the USB controller cancels parameter settings and disconnects the link.

On the other hand, when the instruction for interrupting the link establishment is not received from the communication processor (NO in S914), the processing proceeds to S916. In S916, the USB controller continues the processing and completes the link establishment.

As described above, the communication processor and the USB controller are activated at the same time to concurrently perform the respective starting sequences, which makes it possible to establish a USB link in a shorter time and start communication earlier than the conventional procedure in which the activation sequences are sequentially processed.

In addition, even if the communication processor and the USB controller are not activated at the same time, the USB controller can be activated before the communication processor becomes able to determine whether the USB controller is to be used. Thus, an effect of shortening the time until the link establishment is completed can be obtained.

Also, when the USB controller is not used, the power of the USB controller is turned OFF as soon as the communication processor becomes able to determine whether to use the USB controller, which suppresses an increase in unnecessary power consumption.

Other Exemplary Embodiments

Although a digital camera has been described above as the communication apparatus for the present disclosure, the disclosure is not limited thereto. The communication apparatus may be a personal computer, tablet computer, smart phone, personal digital assistant (PDA), media player, game machine, multifunction peripheral, and other apparatuses.

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above-described exemplary embodiments perform communication device starting processing and automatic negotiation processing in parallel when activating a communication device to start communication, thus shortening the time until communication by the communication device is enabled.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2019-083331, which was filed on Apr. 24, 2019 and which is hereby incorporated by reference herein in its entirety.

What is claimed is:

1. A communication apparatus comprising:
a communication device configured to communicate with an external apparatus; and
one or more processors configured to control the communication apparatus,
wherein, when starting communication with the external apparatus by activating the communication device in a non-operating state, the one or more processors control the communication device such that a setting sequence for making a communication setting for a communication interface based on a predetermined communication method included in the communication device is executed in parallel with a starting sequence for activating the communication device,
wherein the starting sequence includes a process to activate system software for controlling the communication device,
wherein the setting sequence includes a process to automatically set communication ability in accordance with available communication ability of the external apparatus, and
wherein in a case where the setting sequence is executed in parallel with the starting sequence, the process to automatically set communication performance in accordance with available communication performance of the external apparatus is executed in parallel to the process to activate system software for controlling the communication device.

2. The communication apparatus according to claim 1, further comprising a transmission interface configured to transmit a control signal to the communication device,
wherein the one or more processors execute the starting sequence for activating the communication device and determine whether to use the communication interface based on the predetermined communication method in communication with the external apparatus, and
wherein the transmission interface transmits a control signal for instructing the communication device to execute the setting sequence, according to a determination result.

3. The communication apparatus according to claim 1, further comprising a transmission interface configured to transmit a control signal to the communication device,
wherein the one or more processors control the communication device such that the starting and the setting sequences are executed in parallel, and then determine whether to use the communication interface based on the predetermined communication method in communication with the external apparatus, and
wherein the transmission interface transmits a control signal for stopping the setting sequence to the communication device, according to a determination result.

4. The communication apparatus according to claim 1, wherein the communication device includes a communication interface based on the predetermined communication method, a communication interface other than the predetermined communication method, and an interface for prompting a user to select one of the communication interfaces to be used for communication.

5. The communication apparatus according to claim 1, wherein the predetermined communication method is wired communication conforming to the Ethernet® standard.

6. The communication apparatus according to claim 5, wherein the setting sequence automatically performs a communication setting depending on a communication partner.

7. The communication apparatus according to claim 2, wherein the transmission interface transmits the control signal through a dedicated signal line.

8. The communication apparatus according to claim 7, wherein the control signal is a 1-bit signal.

9. The communication apparatus according to claim 1,
wherein the communication device includes an operating system configured to control the communication device, and
wherein the starting sequence includes activating the operating system.

10. The communication apparatus according to claim 9, wherein the operating system is Linux®.

11. A method for controlling a communication apparatus comprising a communication device for communicating with an external apparatus, wherein, when starting communication with the external apparatus by activating the communication device in a non-operating state, the control method controls the communication device such that a setting sequence for making a communication setting for a communication interface based on a predetermined communication method which is included in the communication device is executed in parallel with a starting sequence for activating the communication device,
wherein the starting sequence includes a process to activate system software for controlling the communication device,
wherein the setting sequence includes a process to automatically set communication ability in accordance with available communication ability of the external apparatus, and
wherein in a case where the setting sequence is executed in parallel with the starting sequence, the process to automatically set communication performance in accordance with available communication performance of the external apparatus is executed in parallel to the process to activate system software for controlling the communication device.

12. The method for controlling the communication device according to claim 11,
wherein the control method controls the communication device such that the starting and the setting sequences are executed in parallel, and then determines whether to use the communication interface based on the predetermined communication method in communication with the external apparatus, and
wherein the control method transmits a control signal for stopping the setting sequence to the communication device, according to a determination result.

\* \* \* \* \*